(12) United States Patent
Inoue

(10) Patent No.: US 12,160,687 B2
(45) Date of Patent: Dec. 3, 2024

(54) VEHICLE CONTROL SYSTEM

(71) Applicant: TOYOTA JIDOSHA KABUSHIKI KAISHA, Toyota (JP)

(72) Inventor: Yu Inoue, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 283 days.

(21) Appl. No.: 17/970,243

(22) Filed: Oct. 20, 2022

(65) Prior Publication Data

US 2023/0128827 A1    Apr. 27, 2023

(30) Foreign Application Priority Data

Oct. 25, 2021 (JP) ................ 2021-173782

(51) Int. Cl.
| | |
|---|---|
| *B60R 1/00* | (2022.01) |
| *B60R 1/22* | (2022.01) |
| *B60R 16/023* | (2006.01) |
| *H04N 7/18* | (2006.01) |

(52) U.S. Cl.
CPC ............ *H04N 7/183* (2013.01); *B60R 1/22* (2022.01); *B60R 16/023* (2013.01)

(58) Field of Classification Search
CPC .......... H04N 7/183; H04N 7/181; B60R 1/22; B60R 16/023; B60R 1/00
USPC .......................................... 701/36
See application file for complete search history.

(56) References Cited

U.S. PATENT DOCUMENTS

2022/0201209 A1*  6/2022  Inoue .............. B60R 1/23

FOREIGN PATENT DOCUMENTS

| JP | H06-112939 A | 4/1994 |
|---|---|---|
| JP | 2019-091066 A | 6/2019 |
| JP | 2022-100063 A | 7/2022 |

* cited by examiner

*Primary Examiner* — Shardul D Patel
(74) *Attorney, Agent, or Firm* — Dinsmore & Shohl LLP

(57) ABSTRACT

Provided is a vehicle control system including: a plurality of communication devices each of which is provided between an in-vehicle sensor and a corresponding one of a plurality of control units, and has a control information communication function of transmitting control information from the control unit to the in-vehicle sensor; and a communication control device configured to control the plurality of communication devices. The communication control device sets, in response to an operation state of a vehicle, one of a state in which the control information communication function of one of the plurality of communication devices is enabled and the control information communication function of all of communication devices other than the one of the plurality of communication devices out of the plurality of communication devices is disabled, or a state in which the control information communication function of all of the communication devices is disabled.

6 Claims, 5 Drawing Sheets

| IG | S1 | S2 | ECU(22)→SER(211) | ECU(22)→DES(213) |
|---|---|---|---|---|
| L | L | L | INVa | INVb |
| ↓ | ↓ | ↓ | ↓ | ↓ |
| H | H | H | Va | INVb |
| ↓ | ↓ | ↓ | ↓ | ↓ |
| L | L | L | INVa | INVb |

| IG | AS | S1 | S2 | ECU(22)→SER(211) | ECU(22)→DES(213) |
|---|---|---|---|---|---|
| L | L | L | L | INVa | INVb |
| ↓ | ↓ | ↓ | ↓ | ↓ | ↓ |
| L | H | L | H | INVa | Vb |
| ↓ | ↓ | ↓ | ↓ | ↓ | ↓ |
| L | L | L | L | INVa | INVb |

FIG.5

| IG | AS | S1 | S2 | ECU(22)→SER(211) | ECU(22)→DES(213) |
|---|---|---|---|---|---|
| L | L | L | L | INVa | INVb |
| ↓ | ↓ | ↓ | ↓ | ↓ | ↓ |
| L | H | L | H | INVa | Vb |
| ↓ | ↓ | ↓ | ↓ | ↓ | ↓ |
| H | H | H | H | INVa | INVb |
| ↓ | ↓ | ↓ | ↓ | ↓ | ↓ |
| H | H | H | H | Va | INVb |

VEHICLE CONTROL SYSTEM

CROSS-REFERENCE TO RELATED APPLICATION

This application claims priority to Japanese Patent Application No. 2021-173782 filed on Oct. 25, 2021, the content of which is hereby incorporated by reference in its entirety into this application

BACKGROUND

1. Technical Field

The present disclosure relates to a vehicle control system configured such that one in-vehicle sensor is shared among a plurality of control units.

2. Description of the Related Art

Hitherto, there has been proposed a vehicle control system (hereinafter referred to as "related-art device") including one in-vehicle sensor and a plurality of control units, and being configured such that the in-vehicle sensor is shared among the plurality of control units (see, for example, Japanese Patent Application No. 2020-214205).

The related-art device includes a camera unit (in-vehicle sensor), a first control unit, and a second control unit. Each of those three devices is connected as a node to a serial communication bus. The camera unit outputs image data acquired by photographing a peripheral region of the vehicle. The first control unit and the second control unit can receive the image data from the camera unit. The first control unit and the second control unit can execute first control and second control, respectively, based on the received image data.

The camera unit operates in accordance with parameters (hereinafter referred to as "camera parameters") defining an exposure time, a frame rate, and the like. The camera parameters are transmitted from the first control unit or the second control unit to the camera unit.

The first control unit and the second control unit monitor an operation state of the vehicle. Specifically, the first control unit and the second control unit monitor an ON/OFF state of an ignition switch of the vehicle. In the related-art device, when the ignition switch is in the ON state, the first control unit has a right to transmit the camera parameters to the camera unit, and the second control unit does not have the right to transmit the camera parameters to the camera unit. In contrast, when the ignition switch is in the OFF state, the second control unit has the right to transmit the camera parameters to the camera unit, and the first control unit does not have the right to transmit the camera parameters to the camera unit.

As described above, in the related-art device, in principle, only one of the control units has the right to transmit the camera parameters to the camera unit, but there may actually occur a state in which the first control unit and the second control unit substantially simultaneously transmit the camera parameters to the camera unit. For example, when the ignition switch is switched from the OFF state to the ON state while the second control unit is transmitting the camera parameters, there is a fear in that the first control unit transmits the camera parameters even when the second control unit has not finished the transmission of the camera parameters. In this case, a communication error occurs.

SUMMARY

One object of the present disclosure is to provide a vehicle control system which reduces a frequency of occurrence of a communication error between an in-vehicle sensor and a plurality of control units.

In order to achieve the above-mentioned object, according to at least one embodiment of the present disclosure, there is provided a vehicle control system (1) including: an in-vehicle sensor (10) configured to receive control information (CP), operate in accordance with the control information, measure a predetermined physical quantity, and output detection information (G) indicating a result of the measurement; a plurality of control units (30, 40, 60) each configured to transmit the control information to the in-vehicle sensor, receive the detection information from the in-vehicle sensor, and execute predetermined control based on the detection information; and a hub unit (20) configured to connect the plurality of control units to the in-vehicle sensor. The hub unit includes: a plurality of communication devices (211, 213, 214) each of which is provided between the in-vehicle sensor and a corresponding one of the plurality of control units, and has a control information communication function of transmitting the control information from the one of the plurality of control units to the in-vehicle sensor; and a communication control device (22) configured to control the plurality of communication devices, and the communication control device is configured to set, in response to an operation state of a vehicle, one of a state in which the control information communication function of one of the plurality of communication devices is enabled and the control information communication function of all of communication devices other than the one of the plurality of communication devices out of the plurality of communication devices is disabled, or a state in which the control information communication function of all of the plurality of communication devices is disabled.

In the vehicle control system according to the at least one embodiment of the present disclosure configured as described above, the in-vehicle sensor is shared among the plurality of control units. That is, each control unit can transmit the control information to the in-vehicle sensor. Moreover, each control unit can receive the detection information from the in-vehicle sensor, and can execute the predetermined control based on the received detection information.

In this configuration, the communication control device enables or disables the control information communication function of each communication device in response to the operation state of the vehicle. In this case, the communication control device sets one of the state in which the control information communication function of one communication device is enabled and the control information communication function of the other communication devices is disabled, or the state in which the control information communication function of all of the communication devices is disabled. That is, the vehicle control system is configured such that a state in which the control information communication function of two or more communication devices is simultaneously enabled does not occur. Thus, even when pieces of control information are output substantially simultaneously from the plurality of control units, a state in which the pieces of control information are simultaneously transmitted to the in-vehicle sensor does not occur. As a result, according to the at least one embodiment of the present disclosure, it is possible to reduce the frequency of occurrence of the communication error among the plurality of units forming the vehicle control system compared with the related-art device.

In the vehicle control system of one aspect of the present disclosure, when the communication control device causes a first communication state in which the control information communication function of a first communication device (213) out of the plurality of communication devices is enabled and the control information communication function of all of communication devices other than the first communication device is disabled to transition to a second communication state in which the control information communication function of a second communication device (211) out of the plurality of communication devices is enabled and the control information communication function of all of communication devices other than the second communication device is disabled, the communication control device is configured to cause the first communication state to transition to the second communication state after the control information communication function of all of the plurality of communication devices is disabled.

If the first communication state is caused to directly transition to the second communication state, there is a fear in that a slight difference occurs between a timing at which the control information communication function of the first communication device is disabled and a timing at which the control information communication function of the second communication device is enabled, resulting in a state in which the control information communication function of both of the first communication device and the second communication device is enabled. In contrast, according to this aspect, there is no fear in that the state in which the control information communication function of both of the first communication device and the second communication device is enabled occurs, and hence the frequency of occurrence of the communication error can be further reduced.

In the vehicle control system of another aspect of the present disclosure, when a specific condition is satisfied under a state in which an ignition switch of the vehicle is in an OFF state, the communication control device is configured to cause the state in which the control information communication function of all of the plurality of communication devices is disabled to transition to the first communication state.

With this configuration, when the specific condition is satisfied (for example, when an object approaches the vehicle), it is possible to enable the control information communication function of the first communication device while the control information communication function of all of the communication devices other than the first communication device is disabled. As a result, the communication error does not occur.

In the vehicle control system of still another aspect of the present disclosure, the communication control device is configured to cause the state in which the control information communication function of all of the plurality of communication devices is disabled to transition to the first communication state when the specific condition is satisfied under the state in which the ignition switch of the vehicle is in the OFF state, and to cause, when the ignition switch of the vehicle transitions to an ON state under the first communication state, the first communication state to transition to the second communication state after the control information communication function of all of the plurality of communication devices is disabled.

With this configuration, the first communication state and the second communication state can be switched based on the transition of the ON/OFF state of the ignition switch as a trigger.

In the vehicle control system of yet another aspect of the present disclosure, the in-vehicle sensor is a camera unit configured to output image data indicating an image acquired by photographing a periphery of the vehicle, the plurality of control units include: a first control unit having an electronic mirror function of transmitting the image data to an image display device installed in a cabin of the vehicle to display the image on the image display device; and a second control unit having a recorder function of storing, while converting the image data to moving image data, the moving image data in a storage device, and the first control unit is connected to the camera unit through intermediation of the first communication device, and the second control unit is connected to the camera unit through intermediation of the second communication device.

With this configuration, it is possible to reduce a communication error caused by interference between the communication of the control information (such as parameters defining the operation of the camera) between the camera unit and the first control unit and the communication of the control information between the camera unit and the second control unit.

BRIEF DESCRIPTION OF THE DRAWINGS

FIG. 3 is a state transition table for showing a first aspect of a state transition of the vehicle control system.

FIG. 4 is a state transition table for showing a second aspect of the state transition of the vehicle control system.

FIG. 5 is a state transition table for showing a third aspect of the state transition of the vehicle control system.

DESCRIPTION OF THE EMBODIMENTS (Configuration)

Figure 1:
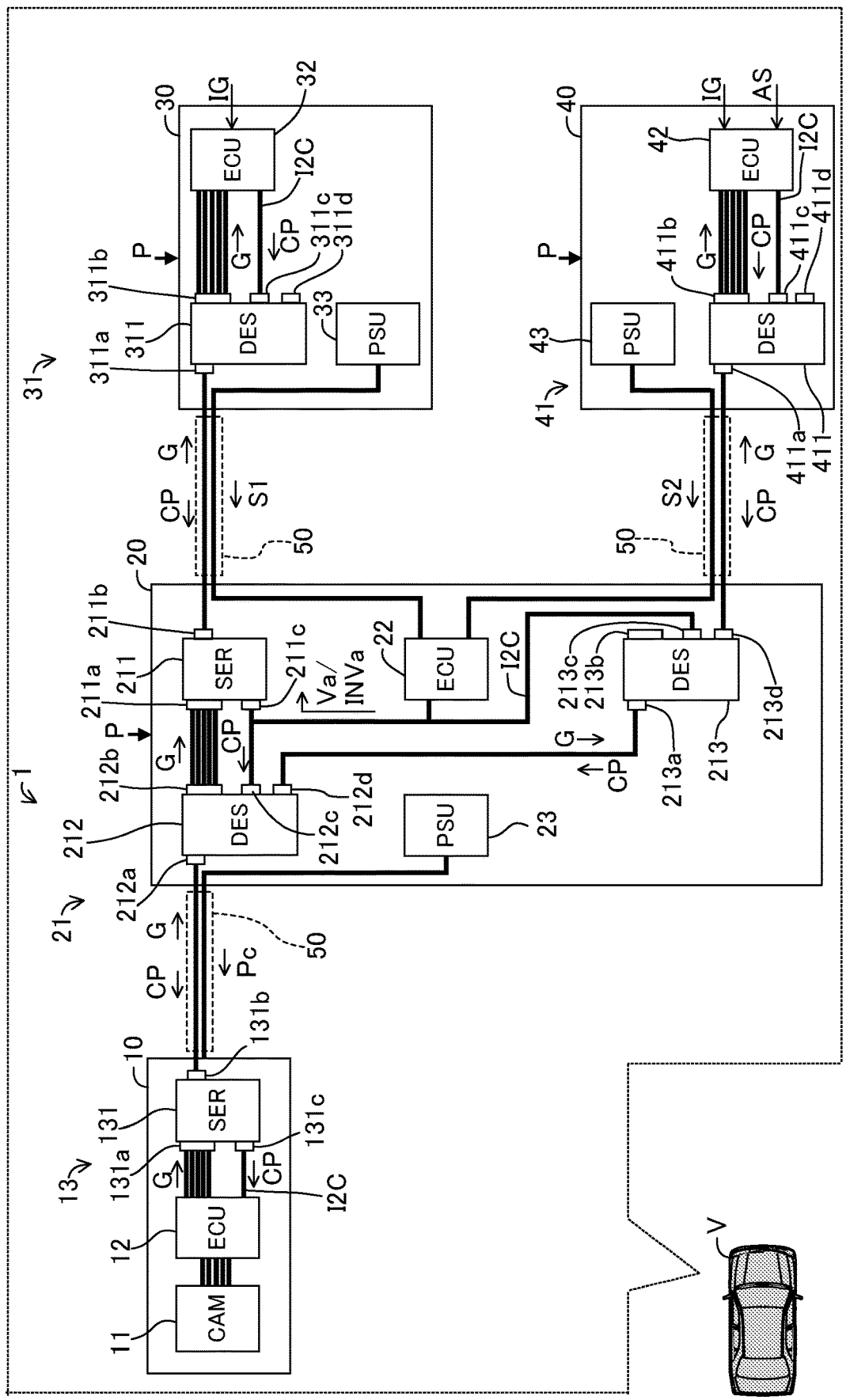
FIG. 1 is a block diagram of a vehicle control system according to at least one embodiment of the present disclosure.

A vehicle control system 1 according to at least one embodiment of the present disclosure is mounted to a vehicle V. As illustrated in FIG. 1, the vehicle control system 1 includes a camera unit 10, a hub unit 20, a first control unit 30, and a second control unit 40. The vehicle control system 1 further includes three communication cables 50. Each of the camera unit 10, the first control unit 30, and the second control unit 40 is connected to the hub unit 20 through intermediation of the communication cable 50.

The camera unit 10 is fixed to, for example, a rear portion of the vehicle V. The hub unit 20, the first control unit 30, and the second control unit 40 are mounted, for example, in an instrument panel. Electric power P is supplied from a battery of the vehicle V to the hub unit 20, the first control unit 30, and the second control unit 40. Moreover, electric power Pc is supplied from the hub unit 20 to the camera unit 10. Regardless of an ON/OFF state of an ignition switch of the vehicle V, the electric power P is supplied to the hub unit 20, the first control unit 30, and the second control unit 40. In principle, the camera unit 10, the hub unit 20, the first control unit 30, and the second control unit 40 operate when the ignition switch is in the ON state, and are suspended when the ignition switch is in the OFF state. However, as described later in detail, there are cases in which the camera unit 10, the hub unit 20, the first control unit 30, and the second control unit 40 operate (are activated) even when the ignition switch is in the OFF state.

The camera unit 10 includes a digital camera 11, a camera ECU 12, and a signal conversion device 13. The camera unit 10 includes an I2C communication bus. The camera ECU 12 and the signal conversion device 13 are connected to the I2C communication bus.

The digital camera 11 includes a lens and an image sensor. The digital camera 11 photographs the rear (and the side) of the vehicle V at predetermined time intervals, generates image data (hereinafter referred to as "original image data G") representing an image (hereinafter referred to as "original image") acquired by the photographing, and supplies the image data to the camera ECU 12.

The camera ECU 12 includes a microcomputer including a CPU, a RAM, a ROM, and others. Herein, "ECU" means an electronic control unit, and includes a microcomputer including a CPU, a RAM, a ROM, and others. The CPU executes instructions stored in the ROM to implement various functions. The camera ECU 12 transmits various camera parameters CP of the digital camera 11 to the digital camera 11. The camera parameters CP are supplied from the first control unit 30 or the second control unit 40 to the camera ECU 12 as described later in detail.

The signal conversion device 13 includes a serializer 131. The serializer 131 includes a port 131a, a port 131b, and an port 131c. The serializer 131 has a function of converting a parallel signal (serial signals having a form of multi-lane and a clock signal compliant with a predetermined image transmission standard) input to the port 131a to low-voltage differential signals D+ and D−, and outputting the low-voltage differential signals D+ and D− signals from the port 131b. Further, the serializer 131 has a function of outputting, from the port 131c, a signal input to the port 131b.

In the following description, a function of causing the port 131b of the serializer 131 to function as an input port and causing the port 131a to function as an output port, to thereby transmit a signal from a device connected to the input port to a device connected to the output port is referred to as "back channel communication function."

The port 131a of the serializer 131 configured as described above is connected to the camera ECU 12. Moreover, the port 131b is connected to the hub unit 20 through intermediation of the communication cable 50. Moreover, the port 131c is connected to the camera ECU 12 through intermediation of the I2C communication bus.

The hub unit 20 includes a signal conversion device 21 and a hub ECU 22. The hub unit 20 includes an I2C communication bus. The signal conversion device 21 and the hub ECU 22 are connected to the I2C communication bus. The signal conversion device 21 includes one serializer 211 and two deserializers 212 and 213.

A configuration of the serializer 211 is equivalent to that of the serializer 131 included in the camera unit 10. That is, the serializer 211 includes ports 211a, 211b, and 211c equivalent to the ports 131a, 131b, and 131c of the serializer 131.

As described later, a command Va for enabling a communication function of the serializer 211 (a function of converting a parallel signal PS input to the port 211a to the low-voltage differential signals D+ and D− and outputting the low-voltage differential signals D+ and D− from the port 211b, and the back channel communication function) or a command INVa for disabling the communication function is supplied to the port 211c as an I2C signal. When the command Va is supplied to the serializer 211, the communication function of the serializer 211 is enabled. Meanwhile, when the command INVa is supplied to the serializer 211, the communication function of the serializer 211 is disabled. However, even under the state in which the communication function of the serializer 211 is disabled, the serializer 211 can receive the command Va.

The deserializer 212 includes a port 212a, a port 212b, and a port 212c. The deserializer 212 has a function of converting the low-voltage differential signals D+ and D− input to the port 212a to a parallel signal (serial signals having a form of multi-lane compliant with a predetermined image transmission standard) and outputting the parallel signal from the port 212b. Moreover, the deserializer 212 has a function of outputting, from the port 212a, a serial signal (a signal compliant with a predetermined communication standard (I2C signal in the at least one embodiment)) input to the port 212c.

Further, the deserializer 212 includes a port 212d. The deserializer 212 has a function of outputting, from the port 212d, the same signals (partially corrected signals) as the low-voltage differential signals D+ and D− input to the port 212a. Further, the deserializer 212 has a function of outputting, from the port 212a, the same signals (partially corrected signals) as signals input to the port 212d.

In the following description, a function of causing the port 212c or the port 212d of the deserializer 212 to function as an input port and causing the port 212a to function as an output port, to thereby transmit a signal from a device connected to the input port to a device connected to the output port is referred to as "back channel communication function."

A configuration of the deserializer 213 is equivalent to that of the deserializer 212. That is, the deserializer 213 includes ports 213a, 213b, 213c, and 213d equivalent to the ports 212a, 212b, 212c, and 212d of the deserializer 212.

As described later, a command Vb for enabling a back channel communication function of the deserializer 213 (a function of causing the port 213c or the port 213d of the deserializer 213 to function as an input port and causing the port 213a to function as an output port, to thereby transmit a signal from a device connected to this input port to a device connected to this output port) or a command INVb for disabling the back channel communication function is supplied to the port 213c as an I2C signal. When the command Vb is supplied to the deserializer 213, the back channel communication function of the deserializer 213 is enabled. Meanwhile, when the command INVb is supplied to the deserializer 213, the back channel communication function of the deserializer 213 is disabled. Regardless of whether the back channel communication function of the deserializer 213 is valid or invalid, the deserializer 213 can convert the low-voltage differential signals D+ and D− input to the port 213a to a parallel signal to output the parallel signal from the port 213b. The deserializer 213 can output, from the port 213d (213a), the same signals as the signals input to the port 213a (213d).

In the at least one embodiment, the back channel communication function of the deserializer 212 is always enabled.

The port 212a of the deserializer 212 configured as described above is connected to the port 131b of the serializer 131 of the camera unit 10 through intermediation of the communication cable 50. Further, the port 212b of the deserializer 212 is connected to the port 211a of the serializer 211. Further, the port 212c of the deserializer 212 is connected to the I2C communication bus. Further, the port 212d of the deserializer 212 is connected to the port 213a of the deserializer 213.

Moreover, the port 211b of the serializer 211 is connected to the first control unit 30 described later through intermediation of the communication cable 50. Further, the port 211c of the serializer 211 is connected to the I2C communication bus.

Moreover, the port 212c of the deserializer 212 is connected to the I2C communication bus. Further, the port 213d of the deserializer 213 is connected to the second control unit 40 described later through intermediation of the communication cable 50. The port 213b of the deserializer 213 is not used.

The hub ECU 22 outputs the above-mentioned commands Va, Vb, INVa, and INVb in response to operation states of the first control unit 30 and the second control unit 40 as described later in detail.

Further, the hub unit 20 includes a power supply unit 23 (a regulator, a switching power supply circuit, or the like) which converts the electric power P supplied from the battery of the vehicle V to the electric power Pc which can be supplied to the camera unit 10.

The serializer 211 and the deserializer 212 correspond to communication devices in the at least one embodiment of the present disclosure. Moreover, the hub ECU 22 corresponds to a communication control device in the at least one embodiment of the present disclosure.

The first control unit 30 includes a signal conversion device 31 and a first ECU 32. The first control unit 30 includes an I2C communication bus. The signal conversion device 31 and the first ECU 32 are connected to the I2C communication bus.

The signal conversion device 31 includes a deserializer 311. A configuration of the deserializer 311 is equivalent to that of the deserializer 212 of the hub unit 20. That is, the deserializer 311 includes ports 311a, 311b, 311c, and 311d. The deserializer 311 has a function of converting the low-voltage differential signals D+ and D− input to the port 311a to a parallel signal (serial signals having a form of multi-lane compliant with a predetermined image transmission standard) and outputting the parallel signal from the port 311b. Moreover, the deserializer 311 has a function of outputting, from the port 311a, a serial signal (a signal compliant with a predetermined communication standard (I2C signal in the at least one embodiment)) input to the port 311c.

The port 311a of the deserializer 311 is connected to the port 211b of the serializer 211 of the hub unit 20 through intermediation of the communication cable 50. Moreover, the port 311c is connected to the I2C communication bus. The port 311d is not used.

The first ECU 32 acquires the original image data G from the camera unit 10 through intermediation of the deserializer 311 and the hub unit 20. After that, the first ECU 32 executes first control based on this original image data G. For example, the first ECU 32 transmits the original image data G acquired from the camera unit 10 to an image display device (for example, a liquid crystal display device) installed in a cabin of the vehicle V. That is, the first ECU 32 displays an image of the rear (or the side) of the vehicle V on this image display device (electronic mirror function).

The first control unit 30 further includes a power supply unit 33 which supplies a part of the electric power P supplied from the battery to the outside. The power supply unit 33 can supply the electric power to the outside when the first ECU 32 is activated. In contrast, the power supply unit 33 cannot supply the electric power to the outside when the first ECU 32 is not activated (suspended). An output port of the power supply unit 33 is connected to the hub ECU 22 of the hub unit 20 through intermediation of the communication cable 50. However, in the at least one embodiment, the electric power is not supplied from the power supply unit 33 to the hub ECU 22, and the output of the power supply unit 33 is simply used as a signal (hereinafter referred to as "activation state signal S1") for detecting a state of the first ECU 32 (whether or not the first ECU 32 is activated). That is, when the ECU 32 is activated, a value (logic level) of the activation state signal S1 is "H," and when the ECU 32 is suspended, the value (logic level) of the activation state signal S1 is "L."

The second control unit 40 has substantially the same configuration as the configuration of the first control unit 30. That is, the second control unit 40 includes a signal conversion device 41 and a second ECU 42. The second control unit 40 includes an I2C communication bus. The signal conversion device 41 and the second ECU 42 are connected to the I2C communication bus. Moreover, the signal conversion device 41 includes a deserializer 411. A configuration and a function of the deserializer 411 are the same as the configuration and the function of the deserializer 311, and ports 411a, 411b, 411c, and 411d.

The second ECU 42 acquires the original image data G from the camera unit 10 through intermediation of the deserializer 411 and the hub unit 20. After that, the second ECU 42 executes second control based on this original image data G. That is, for example, the second ECU 42 stores, while converting the original image data G successively transmitted from the camera unit 10 to moving image data compliant with a predetermined format, the moving image data in a storage device (recorder function).

Further, similarly to the first control unit 30, the second control unit 40 includes a power supply unit 43 which supplies a part of the electric power P supplied from the battery to the outside. The power supply unit 43 can supply the electric power to the outside when the second ECU 42 is activated, and the power supply unit 43 cannot supply the electric power to the outside when the second ECU 42 is not activated (suspended). An output port of the power supply unit 43 is connected to the hub ECU 22 of the hub unit 20 through intermediation of the communication cable 50. However, in the at least one embodiment, the electric power is not supplied from the power supply unit 43 to the hub ECU 22, and the output of the power supply unit 43 is simply used as a signal (hereinafter referred to as "activation state signal S2") for detecting a state of the second ECU 42 (whether or not the second ECU 42 is activated).

Figure 2:
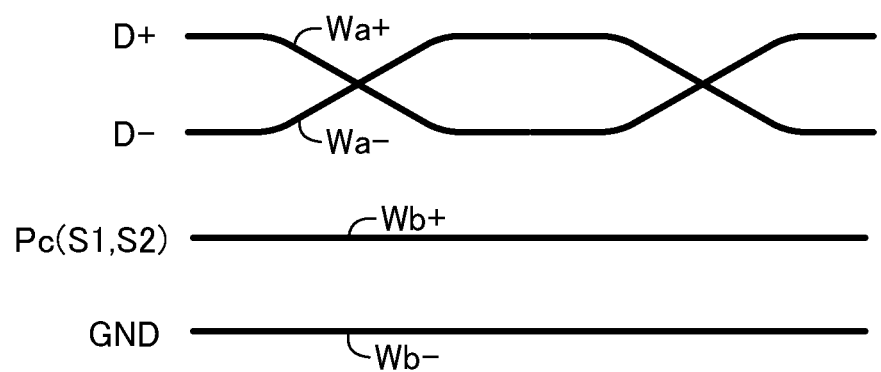
FIG. 2 is a schematic diagram for illustrating a configuration of a communication cable.

As illustrated in FIG. 2, the communication cable 50 includes a pair of electric wires Wa+ and Wa−. The electric wires Wa+ and Wa− are transmission paths for the low-voltage differential signals D+ and D−, respectively. The electric wire Wa+ and the electric wire Wa− are twisted together to form a twisted pair cable. The communication cable 50 further includes a pair of wires Wb+ and Wb−. The wires Wb+ and Wb− are transmission paths for the electric power Pc, the activation state signal S1, or the activation state signal S2. The pair of electric wires Wa+ and Wa− and the pair of electric wires Wb+ and Wb− are accommodated in one sheath to form the one communication cable 50 (wire harness). As the communication cable 50, there may be employed an STQ cable formed by twisting the wires Wa+, Wa−, Wb+, and Wb− together and covering a periphery thereof with a metal foil, a braided wire, or the like.

(Operation)

The first ECU 32 and the second ECU 42 monitor the ON/OFF state (a value of an ignition signal IG) of the ignition switch of the vehicle V. When the ignition switch is in the ON state, the value (logic level) of the ignition signal IG is "H," and when the ignition switch is in the OFF state, the value of the ignition signal IG is "L." In principle, when the ignition switch transitions from the OFF state to the ON state, the first ECU 32 and the second ECU 42 are activated. In constant, when the ignition switch transitions from the ON state to the OFF state, the first ECU 32 and the second ECU 42 are suspended.

The power supply unit 33 is configured such that the activation state signal S1 is "L" when the first ECU 32 is suspended, and the activation state signal S1 is "H" when the first ECU 32 is activated. Further, the power supply unit 43 is configured such that the activation state signal S2 is "L" when the second ECU 42 is suspended, and the activation state signal S2 is "H" when the second ECU 42 is activated.

The hub ECU 22 always monitors the values of the activation state signal S1 and the activation state signal S2. When the values of both of the activation state signal S1 and the activation state signal S2 are "L," the hub ECU 22 is suspended. However, also under this suspension state, the hub ECU 22 always monitors the values of the activation state signal S1 and the activation state signal S2. When the state in which the values of both of the activation state signal S1 and the activation state signal S2 are "L" transitions to a state in which the value of at least one of the activation state signal S1 and the activation state signal S2 has changed from "L" to "H," the hub ECU 22 is activated. When a transition to the state in which the values of the activation state signal S1 and the activation state signal S2 are "L" occurs, the hub ECU 22 is suspended. The power supply unit 23 outputs the electric power Pc when the hub ECU 22 is activated, and does not output the electric power Pc when the hub ECU 22 is suspended. Thus, when the hub ECU 22 is suspended, the camera unit 10 does not operate.

Moreover, the hub ECU 22 transmits a predetermined command to the serializer 211 and the deserializer 213 in response to the changes in values of the activation state signals S1 and S2, to thereby enable or disable the functions of the serializer 211 and the deserializer 213. When the camera unit 10 is activated, all of the functions of the serializer 131 are enabled. Moreover, when the hub ECU 22 is activated, all of the functions of the deserializer 212 are enabled.

Specific Example

For example, as shown in FIG. 3, when the ignition switch transitions from the OFF state to the ON state (the value of the ignition signal IG transitions from "L" to "H"), the first ECU 32 and the second ECU 42 are activated. As a result, the values of the activation state signals S1 and S2 transition from "L" to "H." Consequently, the hub ECU 22 is also activated. After that, the power supply unit 23 starts the supply of the electric power Pc to the camera unit 10. Moreover, the hub ECU 22 transmits the command INVb to the deserializer 213, and transmits the command Va to the serializer 211. As a result, a state in which the back channel communication can be executed between the camera unit 10 and the first control unit 30 and the back channel communication cannot be executed between the camera unit 10 and the second control unit 40 is brought about. That is, when the first ECU 32 outputs the camera parameters CP as the I2C signal, this signal is transmitted to the camera ECU 12 via the deserializer 311, the serializer 211, the deserializer 212, and the serializer 131 in the stated order. After that, the ECU 12 controls (initializes) the digital camera 11 in accordance with the camera parameters CP. Meanwhile, if the second ECU 42 outputs the camera parameters CP as the I2C signal, this signal is transmitted to the deserializer 213 via the deserializer 411. However, the back channel communication function of the deserializer 213 is disabled, and hence this signal is not transmitted to the deserializer 212 and the serializer 131. That is, the communication of the camera parameters CP between the second control unit 40 and the camera unit 10 is interrupted by the deserializer 213.

The digital camera 11 operates in accordance with the camera parameters CP acquired from the first ECU 32. Specifically, the digital camera 11 photographs the rear (and the side) of the vehicle V at predetermined time intervals to generate the original image data G, and transmits this original image data G to the camera ECU 12. The camera ECU 12 transmits this original image data G to the serializer 131. The original image data G transmitted to the serializer 131 is transmitted to the first ECU 32 via the deserializer 212, the serializer 211, and the deserializer 311 in the stated order, and is transmitted to the second ECU 42 via the deserializer 212, the deserializer 213, and the deserializer 411 in the stated order.

The first ECU 32 and the second ECU 42 execute the first control and the second control, respectively, based on the acquired original image data G. When the ignition switch transitions from the ON state to the OFF state (the value of the ignition signal IG transitions from "H" to "L") under this state, the first ECU 32 and the second ECU 42 transition to the suspension state. As a result, the values of the activation state signals S1 and S2 transition from "H" to "L." After the hub ECU 22 transmits the command INVa and the command INVb to the serializer 211 and the deserializer 213, respectively, the hub ECU 22 transitions to the suspension state. Moreover, the power supply unit 23 stops the supply of the electric power Pc to the camera unit 10. As a result, the camera unit 10 stops the operation.

Incidentally, when the ignition switch is in the OFF state (that is, when the vehicle V is parked), a radar sensor (not shown) mounted to the vehicle V operates. For example, the radar sensor measures a distance to an object around the vehicle V, and determines whether or not the object is approaching the vehicle V based on a result of the measurement (change in distance). After that, the radar sensor transmits an approach detection signal AS representing the result thereof. When an object approaching the vehicle V does not exist, a value of the approach detection signal AS is "L," and when an object approaching the vehicle V exists, the value of the approach detection signal AS is "H."

The second ECU 42 monitors the value of the approach detection signal AS under the suspension state. When the second ECU 42 detects a transition of the value of the approach detection signal AS from "L" to "H," the second ECU 42 transitions from the suspension state to the activation state. In this case, the first ECU 32 remains in the suspension state. Thus, as shown in FIG. 4, the value of the activation state signal S1 remains "L," but the value of the activation state signal S2 transitions from "L" to "H." As a result, the hub ECU 22 is activated. After that, the power supply unit 23 starts the supply of the electric power Pc to the camera unit 10. As a result, the camera unit 10 is activated. Further, the hub ECU 22 transmits the command Vb to the deserializer 213, and transmits the command INVa to the serializer 211. As a result, a state in which the communication cannot be executed between the camera unit 10 and the first control unit 30 and the communication can be executed between the camera unit 10 and the second control unit 40 is brought about. Under this state, the first ECU 32 is suspended, and hence the first ECU 32 does not output the camera parameters CP. If the first ECU 32 outputs the camera parameters CP as the I2C signal, this signal is transmitted to the serializer 211 via the deserializer 311. However, the communication function of the serializer 211 is disabled, and hence this signal is not transmitted to the deserializer 212 and the serializer 131. That is, the communication of the camera parameters CP between the first control unit 30 and the camera unit 10 is interrupted by the serializer 211. In contrast, when the second ECU 42 outputs the camera parameters CP as the I2C signal, this signal is transmitted to the camera ECU 12 via the deserializer 411, the deserializer 213, the deserializer 212, and the serializer 131 in the stated order. After that, the ECU 12 controls (initializes) the digital camera 11 in accordance with the camera parameters CP.

The digital camera 11 operates in accordance with the camera parameters CP acquired from the second ECU 42. Specifically, the digital camera 11 photographs the rear (and the side) of the vehicle V at predetermined time intervals to generate the original image data G, and transmits this original image data G to the camera ECU 12. The camera ECU 12 transmits this original image data G to the serializer 131. The original image data G transmitted to the serializer 131 is transmitted to the second ECU 42 via the deserializer 212, the deserializer 213, and the deserializer 411. The communication function of the serializer 211 is disabled, and hence the original image data G is not transmitted to the first control unit 30.

When the object approaching the vehicle V disappears (or when a predetermined period has elapsed since the approach of the object was detected), the value of the approach detection signal AS transitions from "H" to "L." After that, the second ECU 42 transitions from the activation state to the suspension state. As a result, the value of the activation state signal S2 transitions from "H" to "L." Thus, after the hub ECU 22 transmits the command INVa and the command INVb to the serializer 211 and the deserializer 213, respectively, the hub ECU 22 transitions to the suspension state. Moreover, the electric power Pc is not supplied to the camera unit 10, and hence the camera unit 10 stops operating.

Moreover, when the ignition switch transitions from the OFF state to the ON state under the state in which the ignition switch is in the OFF state, the first ECU 32 is suspended, and the second ECU 42 is activated, the first ECU 32 is activated. As a result, as shown in FIG. 5, the value of the activation state signal S1 transitions from "L" to "H." In this case, the hub ECU 22 transmits the commands as described below.

First, the hub ECU 22 transmits the command INVb to the deserializer 213. As a result, the communication of the camera parameters CP between the second control unit 40 and the camera unit 10 is interrupted. Under this state, all the communication between the first control unit 30 and the camera unit 10 is interrupted. The values of the activation state signal S1 and the activation state signal S2 are "H," and the hub ECU 22 is activated. Thus, the power supply unit 23 supplies the electric power Pc to the camera unit 10. As a result, the camera unit 10 remains activated.

Next, the hub ECU 22 transmits the command Va to the serializer 211. As a result, all the communication between the first control unit 30 and the camera unit 10 is permitted. Under this state, the first ECU 32 transmits the camera parameters CP to the camera unit 10. The digital camera 11 operates in accordance with the camera parameters CP acquired from the first ECU 32 to output original image data G. This original image data G is transmitted to the first control unit 30 and the second control unit 40 through intermediation of the hub unit 20.

In the at least one embodiment, a state in which the value of the activation state signal S1 is "H" and the value of the activation state signal S2 is "L" is not assumed.

(Effects)

As described above, in the vehicle control system 1, the camera unit 10 is shared between the first control unit 30 and the second control unit 40. That is, each of the first ECU 32 and the second ECU 42 can transmit the camera parameters CP to the camera unit 10. Moreover, the first control unit 30 and the second control unit 40 can receive the original image data G from the camera unit 10, and can execute the first control and the second control, respectively, based on the received original image data G.

In this case, when the first ECU 32 is activated, the back channel communication of the deserializer 213 of the hub unit 20 is inhibited regardless of the activation state of the second ECU 42. That is, even when the second ECU 42 transmits the camera parameters CP, the communication of the camera parameters CP is interrupted by the deserializer 213. That is, the camera parameters CP output from the second ECU 42 are not transmitted to the camera unit 10.

Moreover, when the first ECU 32 is activated from the state in which the first ECU 32 is suspended and the second ECU 42 is activated, the back channel communication of the deserializer 213 is first inhibited. That is, under this state, the back channel communication of the serializer 211 is inhibited, and the back channel communication of the deserializer 213 is inhibited. As a result, even when the first ECU 32 and the second ECU 42 output the camera parameters CP, none of the camera parameters CP are transmitted to the camera unit 10. After that, the back channel communication of the serializer 211 is permitted. Under this state, the camera parameters CP output from the first ECU 32 are transmitted to the camera unit 10.

As described above, the vehicle control system 1 is configured such that the state in which the back channel communication of the serializer 211 is permitted and the back channel communication of the deserializer 213 is permitted does not occur. That is, the vehicle control system 1 is configured such that a state in which the transmission path for the camera parameters CP from the first ECU 32 to the camera unit 10 and the transmission path for the camera parameters CP from the second ECU 42 to the camera unit 10 are simultaneously connected to the camera unit 10 does not occur. As a result, a state in which the camera parameters CP output from the first ECU 32 and the second ECU 42 are simultaneously transmitted to the camera unit 10 does not occur. Consequently, according to the at least one embodiment, it is possible to reduce the frequency of occurrence of the communication error among the plurality of units forming the vehicle control system 1 compared with the related-art device.

The present disclosure is not limited to the at least one embodiment described above, and as described below, various modification examples can be adopted within the scope of the present disclosure.

Modification Example 1

Figure 6:
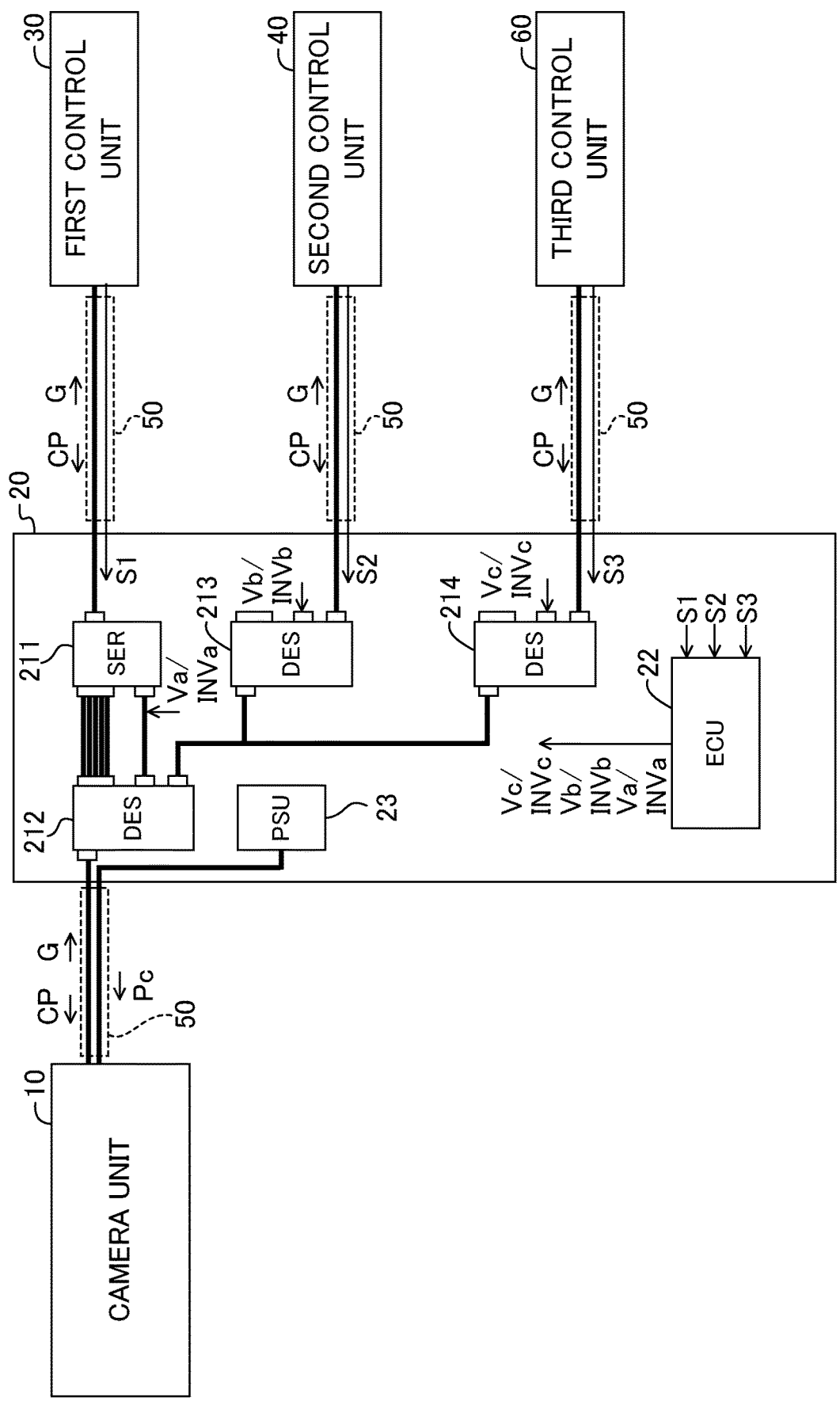
FIG. 6 is a block diagram of a vehicle control system according to a modification example of the at least one embodiment of the present disclosure.

In the above-mentioned at least one embodiment, the camera unit 10 is shared between the two control units (the first control unit 30 and the second control unit 40), but the camera unit 10 may be shared among three or more control units. For example, as illustrated in FIG. 6, a third control unit 60 may be added to the vehicle control system of the above-mentioned at least one embodiment. In this example, the hub unit 20 includes a deserializer 214 which is the same as the deserializer 213. The third control unit 60 is connected to the deserializer 214. An activation state signal S3 is input from the third control unit 60 to the hub ECU 22. The hub ECU 22 enables or disables the functions of the serializer 211, the deserializer 213, and the deserializer 214 in response to a combination of the values of the activation state signals S1, S2, and S3. That is, the hub ECU 22 sets one of a state in which the back channel communication of one device out of the serializer 211, the deserializer 213, and the deserializer 214 is permitted, or a state in which the back channel communication of all of the devices is inhibited. Also with this configuration, the same effects as those in the above-mentioned at least one embodiment are provided.

Modification Example 2

In the above-mentioned at least one embodiment, the hub ECU 22 switches between the state in which the functions of the serializer 211 and the deserializer 213 are enabled and the state in which the functions thereof are disabled in response to the activation states of the first ECU 32 and the second ECU 42 (that is, the values of the activation state signals S1 and S2). In place of this configuration, the hub ECU 22 may switch between the state in which the functions of the serializer 211 and the deserializer 213 are enabled and the state in which the functions thereof are disabled in response to, for example, a shift position of the vehicle. Specifically, when the shift position is switched to "D" (forward position), the hub ECU 22 disables the back channel communication function of the deserializer 213, and enables the communication function of the serializer 211. Moreover, when the shift position is switched to "P" (parking position), the hub ECU 22 disables the communication function of the serializer 211, and enables the back channel communication function of the deserializer 213.

Modification Example 3

In the above-mentioned at least one embodiment, the differential signal transmission method is employed between the units, but a single-ended signal transmission method may be employed in place of the differential signal transmission method. In this case, for example, well-known coaxial cables may be employed as the communication cables 50. In this case, as a method of supplying the electric power Pc from the hub unit 20, well-known power over coaxial (PoC) may be employed.

Modification Example 4

The camera unit 10 in the above-mentioned at least one embodiment corresponds to an in-vehicle sensor in the at least one embodiment of the present disclosure, but the in-vehicle sensor in the at least one embodiment the present disclosure is not limited to the camera unit 10. For example, a radar device may be employed as the in-vehicle sensor.

The vehicle V may be an autonomous vehicle.

What is claimed is:

1. A vehicle control system, comprising:
an in-vehicle sensor configured to receive control information, operate in accordance with the control information, measure a predetermined physical quantity, and output detection information indicating a result of the measurement;
a plurality of control units each configured to transmit the control information to the in-vehicle sensor, receive the detection information from the in-vehicle sensor, and execute predetermined control based on the detection information; and
a hub unit configured to connect the plurality of control units to the in-vehicle sensor,
wherein the hub unit includes:
a plurality of communication devices each of which is provided between the in-vehicle sensor and a corresponding one of the plurality of control units, and has a control information communication function of transmitting the control information from the one of the plurality of control units to the in-vehicle sensor; and
a communication control device configured to control the plurality of communication devices, and
wherein the communication control device is configured to set, in response to an operation state of a vehicle, one of a state in which the control information communication function of one of the plurality of communication devices is enabled and the control information communication function of all of communication devices other than the one of the plurality of communication devices out of the plurality of communication devices is disabled, or a state in which the control information communication function of all of the plurality of communication devices is disabled.

2. The vehicle control system according to claim 1, wherein, when the communication control device causes a first communication state in which the control information communication function of a first communication device out of the plurality of communication devices is enabled and the control information communication function of all of communication devices other than the first communication device is disabled to transition to a second communication state in which the control information communication function of a second communication device out of the plurality of communication devices is enabled and the control information communication function of all of communication devices other than the second communication device is disabled, the communication control device is configured to cause the first communication state to transition to the second communication state after the control information communication function of all of the plurality of communication devices is disabled.

3. The vehicle control system according to claim 2, wherein, when a specific condition is satisfied under a state in which an ignition switch of the vehicle is in an OFF state, the communication control device is configured to cause the state in which the control information communication function of all of the plurality of communication devices is disabled to transition to the first communication state.

4. The vehicle control system according to claim 3, wherein the communication control device is configured to cause the state in which the control information communication function of all of the plurality of communication devices is disabled to transition to the first communication state when the specific condition is satisfied under the state in which the ignition switch of the vehicle is in the OFF state, and to cause, when the ignition switch of the vehicle transitions to an ON state under the first communication state, the first communication state to transition to the second communication state after the control information communication function of all of the plurality of communication devices is disabled.

5. The vehicle control system according to claim 3,
wherein the in-vehicle sensor is a camera unit configured to output image data indicating an image acquired by photographing a periphery of the vehicle,
wherein the plurality of control units include:
a first control unit having an electronic mirror function of transmitting the image data to an image display device installed in a cabin of the vehicle to display the image on the image display device; and
a second control unit having a recorder function of storing, while converting the image data to moving image data, the moving image data in a storage device, and
wherein the first control unit is connected to the camera unit through intermediation of the first communication device, and the second control unit is connected to the camera unit through intermediation of the second communication device.

6. The vehicle control system according to claim 4,
wherein the in-vehicle sensor is a camera unit configured to output image data indicating an image acquired by photographing a periphery of the vehicle,
wherein the plurality of control units include:
a first control unit having an electronic mirror function of transmitting the image data to an image display device installed in a cabin of the vehicle to display the image on the image display device; and
a second control unit having a recorder function of storing, while converting the image data to moving image data, the moving image data in a storage device, and
wherein the first control unit is connected to the camera unit through intermediation of the first communication device, and the second control unit is connected to the camera unit through intermediation of the second communication device.

* * * * *